United States Patent
Ciaccio et al.

(10) Patent No.: US 11,949,178 B2
(45) Date of Patent: Apr. 2, 2024

(54) FUNCTION MODULE FOR ELECTRICAL APPLICATIONS

(71) Applicant: GENTHERM GMBH, Odelzhausen (DE)

(72) Inventors: Michael Peter Ciaccio, Chelsea, MI (US); Michael Weiss, Benediktbeuern (DE)

(73) Assignee: GENTHERM GMBH, Odelzhausen (DE)

( * ) Notice: Subject to any disclaimer, the term of this patent is extended or adjusted under 35 U.S.C. 154(b) by 324 days.

(21) Appl. No.: 17/551,290

(22) Filed: Dec. 15, 2021

(65) Prior Publication Data

US 2023/0187856 A1  Jun. 15, 2023

(51) Int. Cl.
*H01R 12/70* (2011.01)
*H01R 12/68* (2011.01)
*H01R 43/02* (2006.01)

(52) U.S. Cl.
CPC ........... *H01R 12/68* (2013.01); *H01R 12/707* (2013.01); *H01R 43/0256* (2013.01)

(58) Field of Classification Search
CPC .......................... H01R 12/707; H01R 43/0256
See application file for complete search history.

(56) References Cited

U.S. PATENT DOCUMENTS

2002/0162216 A1* 11/2002 Gratzer ................. H01R 43/01
                                                          29/650
2018/0301832 A1* 10/2018 Coakley ................ H01R 12/69
2019/0152002 A1   5/2019 Vinson et al.

FOREIGN PATENT DOCUMENTS

JP    2003-203700 A    7/2003
JP    2003-331961 A    11/2003

OTHER PUBLICATIONS

International Search Report and Written Opinion dated Feb. 13, 2023, for International Application PCT/IB2022/000614.

* cited by examiner

*Primary Examiner* — Jeremy C Norris
(74) *Attorney, Agent, or Firm* — The Dobrusin Law Firm, P.C.

(57) ABSTRACT

A function module for electrical applications and method of making a function module for electrical applications. The function module includes: a functional member having a piercing area with at least one aluminum conductor trace; and an electrical connector having at least one piercing member. The at least one piercing member is configured to pierce through the at least one aluminum conductor trace in an electrically conductive manner and provide a form-fit connection between the functional member and the electrical connector within the piercing area. The functional member and the electrical connector are joined together within the piercing area by means of a solder connection.

18 Claims, 2 Drawing Sheets

FUNCTION MODULE FOR ELECTRICAL APPLICATIONS

FIELD

These teachings relate to a function module for electrical applications and to a method of making a function module for electrical applications.

BACKGROUND

Generally, power cables must be connected to wired function modules for electrical applications. An electrical connector for a power cable can be contacted directly on the aluminum conductor traces of the function module. Such a direct connection can be realized by crimping or piercing and leads to a great cost advantage.

However, when crimping or piercing on inexpensive aluminum conductor paths, the aluminum oxide layer, which grows over time, deteriorates the electrical connection up to total failure.

Another solution for providing an electrically conductive connection between aluminum conductor traces of a function module and an electrical connector is soldering. The document US 2019/0152002 A1 describes a method for soldering aluminum at low temperatures.

It is also known in the art to protect aluminum against aluminum oxide formation, e.g., by elaborate nickel plating of the aluminum surface. In some applications the inexpensive aluminum conductor traces are replaced by more expensive copper conductors or copper-coated aluminum conductors. In other applications expensive electrically conductive adhesives with complex processing procedures are used to permanently contact aluminum traces.

An expensive solution is also to solder connection pins of an electrical connector to a printed circuit board (PCB) and then glue the printed circuit board to an aluminum foil or solder it to copper-coated aluminum (CCA).

SUMMARY

The object of these teachings is to allow for a permanent electrical connection between at least one aluminum conductor trace and an electrical connector that is mechanically resilient, inexpensive to manufacture, and robust against oxide layer formation.

The object is solved by a function module of the aforementioned kind, wherein the functional member and the electrical connector are joined together within the piercing area by means of a solder connection.

Additional soldering of the piercing connection completely prevents oxidation. The piercing connection can be a crimping connection. Piercing, especially crimping, adds mechanical retention compared to a usual soldering connection. By additional soldering, an effective protection against corrosion is achieved. Further, the piercing- or crimp-connection gets mechanically relieved by the solder connection. Thus, even with inexpensive materials, such as aluminum and polyester, durable and resilient electrical contacts can be produced with a combination of standard processes. A combination of crimping and soldering is not obvious for a person skilled in the art since both methods are usually used independently and are sufficient on their own. Because electronics are always very cost-driven, unnecessary redundancy should usually be avoided to avoid a cost increase. Further, pierced connections, such as crimping connections, were developed because strands soak up solder and harden. As a result, the connections become brittle, susceptible to vibration and fail mechanically. It therefore seems absurd to a person skilled in the art to abandon the advantages of piercing connections by soldering.

These teachings provide a function module for electrical applications, comprising a functional member having at least one aluminum conductor trace, and an electrical connector having at least one piercing member, wherein the piercing member is pierced through the aluminum conductor trace in an electrically conductive manner and provides a form-fit connection between the functional member and the electrical connector within a piercing area.

These teachings provide a method for producing a function module for electrical applications, comprising the steps of providing a functional member having at least one aluminum conductor trace, providing an electrical connector having at least one piercing member and piercing the piercing member of the electrical connector through the aluminum conductor trace within a piercing area such that an electrically conductive form-fit connection between the piercing member of the electrical connector and the aluminum conductor trace is established.

The functional member according to these teachings can have one or multiple aluminum conductor traces. The electrical connector can have one or multiple piercing members. Each piercing member can be pierced through another aluminum conductor trace. The tips of the piercing members can be bent over on the back of the functional member to prevent an unintentional detachment.

In one embodiment of the function module according to these teachings, the solder connection is based on a surface activation composition comprising an aqueous solvent and/or a mixed aqueous solvent and/or an organic amine. The organic amine can be selected from the group comprising or consisting of an ethanolamine and a dodecylamine. In another embodiment, the surface activation composition comprises or consists of a fatty acid and/or a filler selected from the group comprising or consisting of Sn, Ag, Zn, Cu, In, Sb, Bi, Au, Cd, Al, Si, Ge, Co, Ni, P, Cr, Se, Te, oxides thereof, or combinations thereof, in an amount less than about 25% weight basis. The fatty acid can be palmitic acid or a salt of palmitic acid. The surface activation composition may comprise or consist of a mixture of fatty acids, salts of fatty acids, amine fluorides, amine acid fluorides, and amine tetrafluoroborates in an aqueous solution, wherein rheology can be adjusted for a printing technique by the addition of an organic cosolvent. The organic cosolvent can be selected from the group comprising or consisting of a hydrocarbon, a halogenated hydrocarbon, and an alcohol. The organic cosolvent can be selected from the group comprising or consisting of saturated, partially unsaturated, or unsaturated $C_{6-20}$ alkyls. The surface activation composition may comprise or consist or the amine hydrofluoride in an aqueous solvent that does not include an organic solution. The surface activation composition may comprise or consist of a mixture of fatty acids, salts of fatty acids, amine fluorides, amine acid fluorides, and amine tetrafluoroborates in an aqueous solution that does not include an organic solvent.

In another preferred embodiment of the function module according to these teachings, the electrical connector is a crimp connector. Hence, the at least one piercing member is a crimping member. Preferably, the crimp member is pierced through the aluminum conductor trace in an electrically conductive manner by means of a manual crimp tool.

In another advantageous embodiment of the function module according to these teachings, the functional member is a foil composite and/or comprises one or more foil layers.

The functional member may comprise a carrier foil for the at least one aluminum conductor trace. The carrier foil can be configured as a plastic film. The carrier foil can carry one or multiple aluminum conductor traces. Outside the piercing area the aluminum conductor traces can be covered by a cover foil. The cover foil can be configured as a plastic film.

In another embodiment of the function module according to these teachings, the aluminum conductor trace is a mechanical structured trace. The aluminum conductor trace is not created by etching or is free of etching or other chemical removing processes. The aluminum conductor trace is created by mechanical processing. For example, the aluminum conductor trace is produced from an aluminum layer by removing aluminum material, for example by machining or cutting. In such a process, a cutting tool can be used to remove small chips or sections of aluminum material from the aluminum layer in order remove material tracks and to form one or multiple aluminum conductor traces.

In another embodiment of the function module according to these teachings, the solder connection prevents or delays the formation of an oxide layer on the aluminum conductor trace within the piercing area. The solder wets the electrical connector and the aluminum conductor trace, so that no insulating oxide layer can form on the aluminum irrespective of temperature, humidity and/or aging. The connection between the least one piercing member and the at least one aluminum conductor trace is electrically conductive or permanently electrically conductive.

In another embodiment of the function module according to these teachings, the form-fit connection between the functional member and the electrical connector within the piercing area provides a mechanical strain relief for the solder connection. Further, the solder connection between the functional member and the electrical connector within the piercing area can provide a mechanical strain relief for the form-fit connection.

In another embodiment of the function module according to these teachings, the solder connection comprises solder material positioned between the functional member and the electrical connector, wherein the solder material seals gaps at penetration edges between the piercing member and the aluminum conductor trace. Before curing, the solder material flows into the gaps at the piercing edges between the piercing member and the aluminum conductor trace. This seal effectively protects the area of the piercing edges against corrosion.

In another embodiment of the function module according to these teachings, the function module is a cell connector for electrical energy storage cells.

In another embodiment of the function module according to these teachings, the function module is an electrical heating device, preferably an electrically operatable heating foil with one or multiple heating tracks.

The object of these teachings is also solved by a method for producing a function module for electrical applications of the aforementioned kind, wherein the functional member and the electrical connector are soldered together within the piercing area by using a solder material and a surface activation composition. The method according to these teachings is preferably used to produce a function module according to one of the embodiments described above.

The surface activation composition is used to pre-treat the piercing area before depositing the solder material. The solder material can be a solder paste with flux included. Alternatively, a material mix including the solder material as well as the surface activation composition can be used for soldering together the functional member and the electrical connector within the piercing area, such that no separate pre-treatment of the piercing area with the surface activation composition is necessary. The piercing of the piercing member through the aluminum conductor trace within a piercing area preferably takes place as part of a crimping process.

In a preferred embodiment of the method according to these teachings, the surface activation composition is deposited, preferably printed, onto the functional member and/or onto the aluminum conductor trace within the piercing area. Depositing the surface activation composition is preferably performed by using a printing technique. The printing technique is selected from the group comprising or consisting of screen printing, pad printing, inkjet printing, stencil printing, and gravure printing. The method can further comprise the step of depositing, preferably printing, the solder material onto the surface activation composition within the piercing area. Depositing the solder material is preferably performed by using a printing technique. The printing technique is selected from the group comprising or consisting of screen printing, pad printing, inkjet printing, stencil printing, and gravure printing. Preferably the surface activation composition is deposited on multiple aluminum conductor traces within the piercing area and dried after deposition. After drying the solder material is applied onto a surface activation composition layer. After application of the solder material multiple piercing members of the electrical connector are positioned in the piercing area and pierced through the solder material, the surface activation composition and the functional member and its aluminum conductor traces. Then the piercing area is heated and soldered. Since low-melting solder can be used, the functional member can comprise inexpensive polyester carrier foils for carrying the aluminum conductor traces.

In another embodiment of the method according to these teachings, the piercing member of the electrical connector is pierced through the surface activation composition and/or the solder material before or at the same time the piercing member of the electrical connector is pierced through the aluminum conductor trace. The piercing area is heated after the surface activation composition and/or the solder material is deposited and/or the piercing member of the electrical connector is pierced through the aluminum conductor trace.

In another embodiment of the method according to these teachings, the surface activation composition comprises an aqueous solvent or a mixed aqueous solvent and/or an organic amine and/or a fatty acid. The organic amine is selected from the group consisting of an ethanolamine and a dodecylamine. The fatty acid is palmitic acid or a salt of palmitic acid. The surface activation composition is preferably deposited in the form of a gel or cream. The surface activation composition preferably comprises an amine hydrofluoride in an aqueous solvent that does not include an organic solution, and that is formulated as a gel. The surface activation composition preferably comprises a mixture of fatty acids, salts of fatty acids, amine fluorides, amine acid fluorides, and amine tetrafluoroborates in an aqueous solution that does not include an organic solvent, and that is formulated as a gel. The surface activation composition preferably comprises a mixture of fatty acids, salts of fatty acids, amine fluorides, amine acid fluorides, and amine tetrafluoroborates in an aqueous solution, wherein rheology is adjusted for a printing technique by the addition of an organic cosolvent. The organic cosolvent can be selected from the group consisting of a hydrocarbon, a halogenated hydrocarbon, and an alcohol. The organic cosolvent can be selected from the group consisting of saturated, partially unsaturated, or unsaturated $C_{6-20}$ alkyls.

BRIEF DESCRIPTION OF THE DRAWINGS

Preferred embodiments of these teachings are explained and described in more detail below with reference to the accompanying drawings.

DETAILED DESCRIPTION

Figure 1:
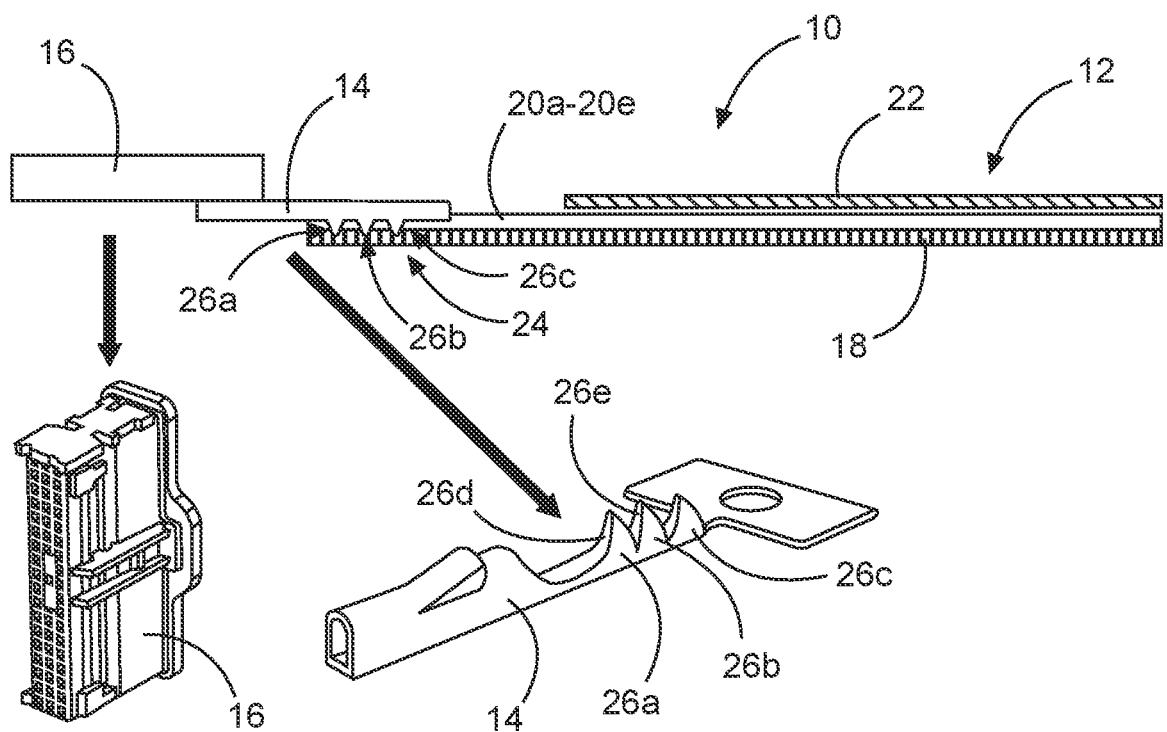
FIG. 1 shows an embodiment of the function module.

According to FIG. 1, the function module 10 comprises a functional member 12, wherein the functional member 12 is a foil composite and comprises one or multiple foil layers. The function module 10 further comprises an electrical connector 14, wherein the electrical connector 14 is a metallic crimp connector. A plug 16 is attached to the electrical connector 14.

The function module 10 can be, for instance, a cell connector for electrical energy storage cells or an electrical heating device.

The bottom layer 18 of the functional member 12 is a thin plastic carrier foil 18. The carrier foil 18 carries one or multiple aluminum conductor traces 20a-20e. The aluminum conductor traces 20a-20e are mechanical structured traces 20a-20e that are produced from an aluminum layer by mechanically removing the aluminum material. The aluminum conductor traces 20a-20e are covered by a thin plastic cover foil 22. The cover foil 22 does not extend over the entire length of the functional member 12. A piercing area 24 is not covered by the cover foil 22.

The electrical connector 14 has one or multiple piercing members 26a-26e. The piercing members 26a-26e are configured to pierce through the aluminum conductor traces 20a-20e in an electrically conductive manner and provide a form-fit connection between the functional member 12 and the electrical connector 14 within the piercing area 24. Even if it is not shown, the tips of the piercing members 26a-26e can be bent over on the back of the functional member 12 to secure the crimp and prevent the crimp from becoming detached. Additionally, the functional member 12 and the electrical connector 14 can be joined together within the piercing area 24 by means of a solder connection.

The form-fit connection between the functional member 12 and the electrical connector 14 within the piercing area 24 provides a mechanical strain relief for the solder connection. The solder connection between the functional member 12 and the electrical connector 14 within the piercing area 24 provides a mechanical strain relief for the form-fit connection.

The solder connection comprises solder material positioned between the functional member 12 and the electrical connector 14, wherein the solder material seals gaps at penetration edges between the piercing members 26a-26e and the aluminum conductor traces 20a-20e and thereby prevents or at least delays the formation of an oxide layer on the aluminum conductor traces 20a-20e within the piercing area 24 irrespective of temperature, humidity and/or aging.

The solder connection between the functional member 12 and the electrical connector 14 within the piercing area 24 is based on a surface activation composition. The surface activation composition comprises an aqueous solvent or a mixed aqueous solvent and/or an organic amine and/or a fatty acid and/or a filler selected from the group consisting of Sn, Ag, Zn, Cu, In, Sb, Bi, Au, Cd, Al, Si, Ge, Co, Ni, P, Cr, Se, Te, oxides thereof, or combinations thereof, preferably in an amount less than 25% weight basis.

FIGS. 2 to 6 show consecutive steps of a method for producing a function module 10 for electrical applications, namely the function module 10 shown in FIG. 1.

Figure 2:
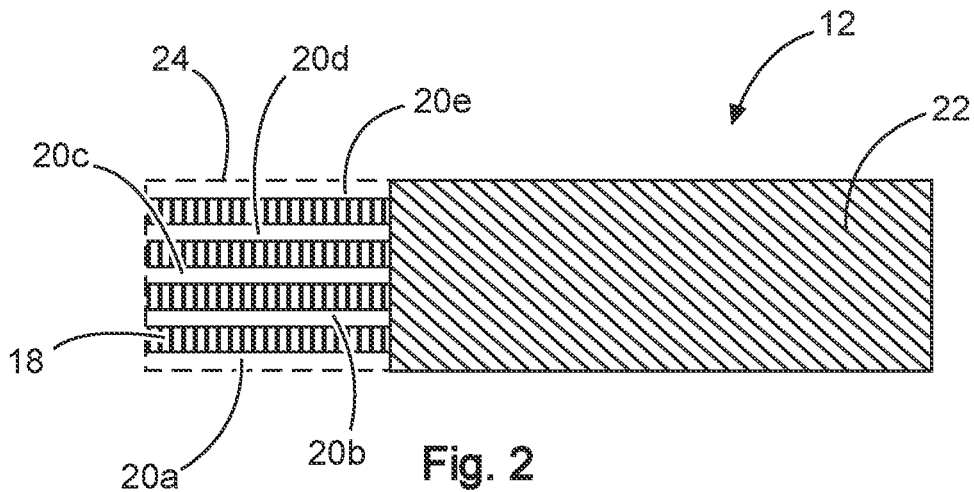
FIG. 2 shows a functional member of the function module in a schematic top view.
Figure 3:
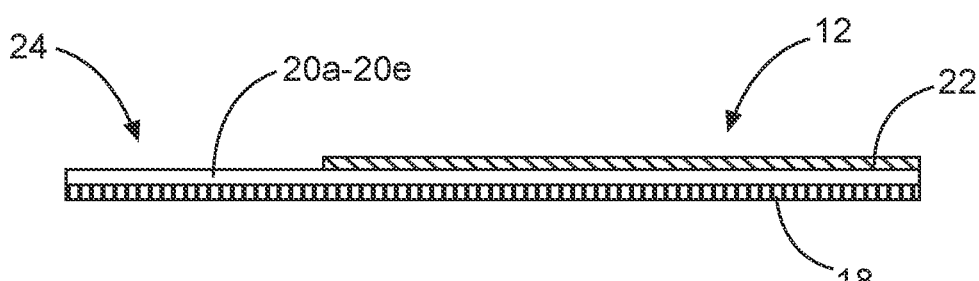
FIG. 3 shows the functional member of FIG. 2 in a schematic side view.

As shown in FIGS. 2 and 3, first a functional member 12 having multiple parallel aluminum conductor traces 20a-20e is provided. The functional member 12 is a foil composite and comprises multiple foil layers. The bottom layer of the functional member 12 is a thin plastic carrier foil 18. The carrier foil 18 carries the multiple aluminum conductor traces 20a-20e. The aluminum conductor traces 20a-20e are covered by a thin plastic cover foil 22. The cover foil 22 does not extend over the entire length of the functional member 12. A piercing area 24 is not covered by the cover foil 22.

Figure 4:
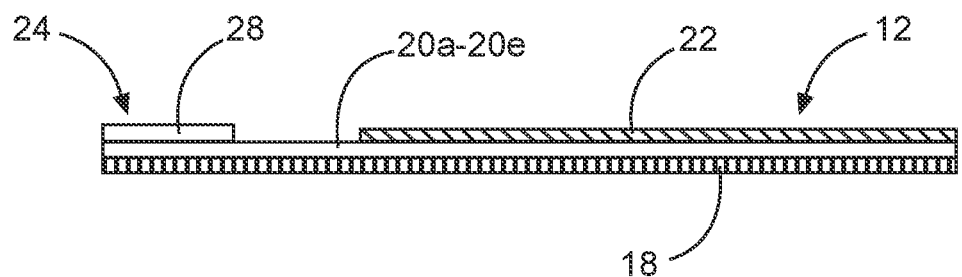
FIG. 4 shows the functional member of FIG. 2 after deposition of a surface activation composition in a schematic side view.

Next, as shown in FIG. 4, a surface activation composition 28 is deposited onto the aluminum conductor traces 20a-20e within the piercing area 24. Depositing the surface activation composition 28 is performed by using a printing technique. The surface activation composition 28 comprises an aqueous solvent or a mixed aqueous solvent and/or an organic amine and/or a fatty acid.

Figure 5:
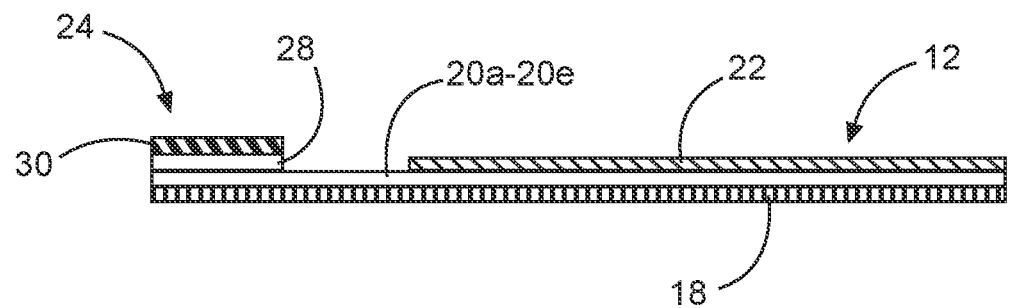
FIG. 5 shows the functional member of FIG. 2 after deposition of a solder material in a schematic side view.

Next, as shown in FIG. 5, solder material 30 is deposited onto the surface activation composition 28 within the piercing area 24. Depositing the solder material 30 is also performed by using a printing technique. The solder material 30 is a solder paste with flux included.

Figure 6:
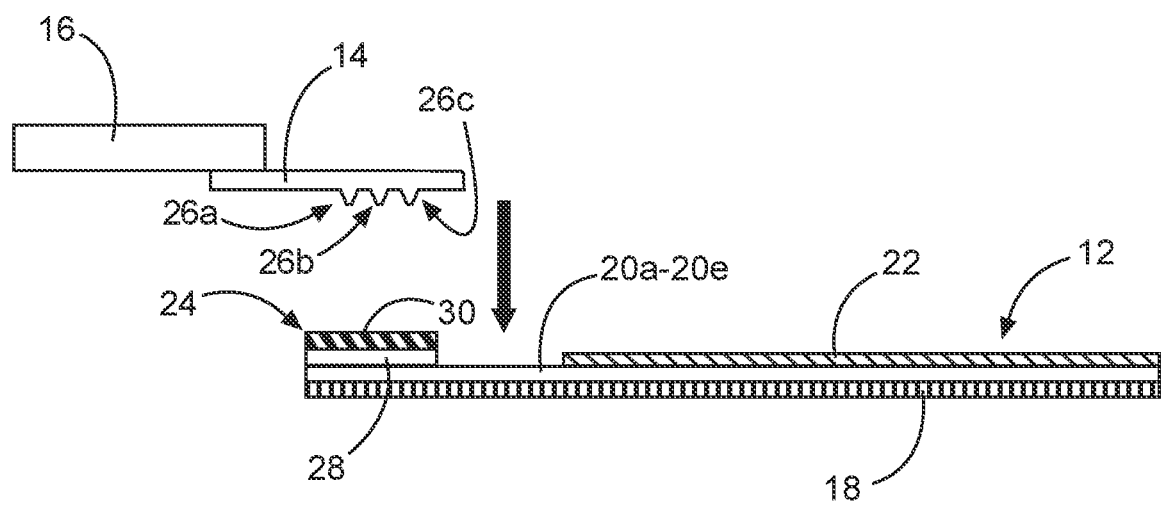
FIG. 6 shows the functional member of FIG. 2 just before the piercing members are pierced through the aluminum conductor traces.

After the solder material 30 has been deposited onto the surface activation composition 28, an electrical connector 14 having multiple piercing members 26a-26e is positioned such that the piercing members 26a-26e are just above the piercing area 24, as shown in FIG. 6. Then, the piercing members 26a-26e of the electrical connector 14 are pierced through the surface activation composition 28, the solder material 30 and the aluminum conductor traces 20a-20e within the piercing area 24 such that an electrically conductive form-fit connection between the piercing members 26a-26e of the electrical connector 14 and the aluminum conductor traces 20a-20e is established.

Afterwards, the functional member 12 and the electrical connector 14 are soldered together within the piercing area 24 by heating the solder material 30 and the surface activation composition 28.

It is understood that the method or process steps described herein can be performed in virtually any order. Moreover, one or more of the method or process steps can be combined with other steps; can be omitted or eliminated; can be repeated; and/or can separated into individual or additional steps.

The explanations and illustrations presented herein are intended to acquaint others skilled in the art with these teachings, invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" or "an" to describe an element or step is not intended to foreclose additional elements or steps. For example, disclosure of "an electrical connector" does not limit the teachings to a single electrical connector. Instead, for example, disclosure of "an electrical connector" may include "one or more electrical connectors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The teachings and invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

LIST OF REFERENCE SIGNS 10 function module
12 functional member
14 electrical connector
16 plug
18 carrier foil
20a-20e aluminum conductor traces
22 cover foil
24 piercing area
26a-26e piercing members
28 surface activation composition
30 solder material

The invention claimed is:

1. A function module for electrical applications, comprising:
a functional member having a piercing area with at least one aluminum conductor trace; and
an electrical connector having at least one piercing member, wherein the at least one piercing member is configured to pierce through the at least one aluminum conductor trace and to provide a form-fit connection between the functional member and the electrical connector within the piercing area;
wherein the functional member and the electrical connector are joined together within the piercing area by a solder connection, and
wherein the solder connection is based on a surface activation composition comprising: an aqueous solvent or a mixed aqueous solvent; and/or an organic amine; and/or a fatty acid; and/or a filler selected from a group consisting essentially of SN, Ag, Zn, Co, In, Sb, Bi, Au, Cd, A, Si, Ge, Co, Ni, P, Cr, Se, Te, oxides thereof or combinations thereof, in an amount less than 25% weight basis.

2. The function module according to claim 1, wherein the electrical connector is a crimp connector.

3. The function module according to claim 1, wherein the functional member is a foil composite and/or comprises one or more foil layers.

4. The function module according to claim 1, wherein the at least one aluminum conductor trace is a mechanical structured trace.

5. The function module according to claim 1, wherein the solder connection prevents or delays formation of an oxide layer on the at least one aluminum conductor trace within the piercing area.

6. The function module according to claim 1, wherein the form-fit connection is formed between the functional member and the electrical connector within the piercing area to provide a mechanical strain relief for the solder connection; and/or the solder connection between the functional member and the electrical connector within the piercing area provides a mechanical strain relief for the form-fit connection.

7. The function module according to claim 1, wherein the solder connection comprises solder material positioned between the functional member and the electrical connector, wherein the solder material seals gaps at penetration edges between the at least one piercing member and the at least one aluminum conductor trace.

8. The function module according to claim 1, wherein the function module is a cell connector for electrical energy storage cells.

9. The function module according to claim 1, wherein the function module is an electrical heating device.

10. A method for producing the function module according to claim 1, comprising steps of:

piercing the at least one piercing member of the electrical connector through the at least one aluminum conductor trace within the piercing area such that the form-fit connection between the piercing member of the electrical connector and the at least one aluminum conductor trace is established; and soldering together the functional member and the electrical connector within the piercing area using a solder material and the surface activation composition.

11. The method according to claim 10, wherein the method comprises:
depositing or printing, the surface activation composition onto the functional member and/or onto the at least one aluminum conductor trace within the piercing area; and/or
depositing or printing the solder material onto the surface activation composition within the piercing area.

12. The method according to 11, wherein the method comprises: heating the piercing area after the surface activation composition and/or the solder material is deposited; and/or heating the piercing area after the at least one piercing member of the electrical connector is pierced through the least one aluminum conductor trace.

13. The method according to claim 10, wherein the at least one piercing member of the electrical connector is pierced through the surface activation composition and/or the solder material before or at the same time the at least one piercing member of the electrical connector is pierced through the at least one aluminum conductor trace.

14. The method according to claim 10, wherein the surface activation composition comprises: aqueous solvent or the mixed aqueous solvent; and/or the organic amine; and/or the fatty acid.

15. A method for producing a function module comprising: piercing at least one piercing member of an electrical connector through at least one aluminum conductor trace within a piercing area of a functional member such that the form-fit connection is established between the piercing member of the electrical connector and the at least one aluminum conductor trace of the functional member; and soldering together the functional member and the electrical connector within the piercing area using a solder material and a surface activation composition, wherein the surface activation composition comprises: an aqueous solvent or a mixed aqueous solvent; and/or
an organic amine; and/or a fatty acid.

16. The method according to claim 15, wherein the method comprises:
depositing or printing, the surface activation composition onto the functional member and/or onto the at least one aluminum conductor trace within the piercing area; and/or
depositing or printing the solder material onto the surface activation composition within the piercing area.

17. The method according to claim 16, wherein the method comprises: heating the piercing area after the surface activation composition and/or the solder material is deposited; and/or heating the piercing area after the at least one piercing member of the electrical connector is pierced through the at least one aluminum conductor trace.

18. The method according to claim 15, wherein the at least one piercing member of the electrical connector is pierced through the surface activation composition and/or the solder material before or at the same time the at least one piercing member of the electrical connector is pierced through the at least one aluminum conductor trace.

* * * * *

UNITED STATES PATENT AND TRADEMARK OFFICE
CERTIFICATE OF CORRECTION

PATENT NO. : 11,949,178 B2
APPLICATION NO. : 17/551290
DATED : April 2, 2024
INVENTOR(S) : Michael Peter Ciaccio and Michael Weiss It is certified that error appears in the above-identified patent and that said Letters Patent is hereby corrected as shown below:

In the Claims

Column 8, Line 32, Claim 1, delete "SN" and insert --Sn--
Column 8, Line 33, Claim 1, delete "A," and insert --Al--

Signed and Sealed this
Twenty-first Day of May, 2024

Katherine Kelly Vidal
*Director of the United States Patent and Trademark Office*